United States Patent
Singer et al.

(10) Patent No.: US 11,899,969 B1
(45) Date of Patent: Feb. 13, 2024

(54) RE-ORDER BUFFER FOR IN-ORDER EXECUTION OF DEPENDENT WRITE TRANSACTIONS

(71) Applicant: Amazon Technologies, Inc., Seattle, WA (US)

(72) Inventors: Barak Singer, Tel Aviv-Jaffa (IL); Guy Nakibly, Kedumim (IL); Jonathan Cohen, Hod Hasharon (IL); Simaan Bahouth, Shefar'am (IL)

(73) Assignee: Amazon Technologies, Inc., Seattle, WA (US)

( * ) Notice: Subject to any disclaimer, the term of this patent is extended or adjusted under 35 U.S.C. 154(b) by 57 days.

(21) Appl. No.: 17/805,633

(22) Filed: Jun. 6, 2022

(51) Int. Cl.
*G06F 3/06* (2006.01)

(52) U.S. Cl.
CPC .......... *G06F 3/0656* (2013.01); *G06F 3/0604* (2013.01); *G06F 3/0679* (2013.01)

(58) Field of Classification Search
CPC ..... G06F 3/0656; G06F 3/0604; G06F 3/0679
See application file for complete search history.

(56) References Cited

U.S. PATENT DOCUMENTS

| | | | | |
|---|---|---|---|---|
| 8,478,907 B1 * | 7/2013 | Aloni | ................ | G06F 13/128 |
| | | | | 719/321 |
| 10,019,171 B2 * | 7/2018 | Tzori | ................ | G06F 3/0688 |
| 2003/0204692 A1 * | 10/2003 | Tamer | ................ | G06F 3/0601 |
| | | | | 711/163 |
| 2010/0257138 A1 * | 10/2010 | Wang | ................ | G06F 16/2358 |
| | | | | 707/634 |
| 2011/0184714 A1 * | 7/2011 | Zhang | ................ | G06F 30/33 |
| | | | | 703/13 |
| 2014/0372699 A1 * | 12/2014 | Desai | ................ | G06F 12/0802 |
| | | | | 711/118 |
| 2017/0249081 A1 * | 8/2017 | Tzori | ................ | G06F 3/0608 |

\* cited by examiner

*Primary Examiner* — Hiep T Nguyen
(74) *Attorney, Agent, or Firm* — Weaver Austin Villeneuve & Sampson LLP

(57) ABSTRACT

Techniques are described for maintaining in-order execution when a dependency exists between write transactions. In some embodiments, a write re-order buffer (WROB) is configured to assign the same group ID to an incoming write transaction upon determining that the incoming write transaction is dependent on a pending write transaction. The WROB forwards the incoming write transaction to an interconnect fabric for routing to a completer device. The interconnect fabric enforces in-order execution when write transactions share the same group ID. The WROB can maintain a transaction log of pending write transactions and also track the statuses of responses for such transactions. Transaction responses can include responses sent from a completer to confirm that a transaction has actually been completed. Additionally, the WROB can send a response indicating completion back to the requester of the transaction. In some embodiments, the WROB is configured to send an early response to the requester.

20 Claims, 10 Drawing Sheets

Transaction Log
300

| Transaction ID | Group ID | Dependencies | Source Address | Destination Address | Response Received? | Response Returned? |
|---|---|---|---|---|---|---|
| D0 | 0 | -- | -- | 0xABC | Yes | Yes |
| D1 | 0 | -- | -- | 0xBCD | No | No |
| D2 | 0 | D0, D1 | 0xABC, 0xBCD | 0xCDE | No | No |
| D3 | 1 | -- | 0xDEF | 0xDEG | No | No |

FIG. 3A

Transaction Log
302

| Transaction ID | Group ID | Dependencies | Source Address | Destination Address | Response Received? | Response Returned? |
|---|---|---|---|---|---|---|
| D4 | 2 | -- | -- | 0xCBE | Yes | Yes ← 310 |
| D5 | 2 | D4 | -- | 0xCBE | No | Yes ← 312 |

FIG. 3B

RE-ORDER BUFFER FOR IN-ORDER EXECUTION OF DEPENDENT WRITE TRANSACTIONS

BACKGROUND

Integrated circuits and other computing systems can include components that are communicatively intercoupled through an interconnect fabric. The interconnect fabric can include wiring (e.g., buses) and logic to move data from one component to another component. In some cases, the interconnect fabric is used to convey a request for executing a computing transaction. Such transactions may include memory transactions, for example, a read or write to a specified memory address. The component executing the transaction usually sends a response back to the requester upon completion of the transaction. Because the request and the response take time to propagate through the interconnect fabric, it is possible that the request and/or the response may be re-ordered relative to other messages that are placed onto the interconnect fabric for delivery. For instance, a first request for a first write transaction may arrive at the interconnect fabric before a second request for a second write transaction, but the second request may reach its destination sooner as a result of taking a lower latency path. Consequently, the second write transaction may execute before the first write transaction, in which case the response for the second write transaction may arrive at the interconnect fabric earlier than the response for the first write transaction. A response may or may not take the same path from a destination to a requester as the path taken by a request from the requester to the destination. Re-ordering of write transaction requests and/or responses to such requests can lead to incorrect data being accessed when there is a dependency between two or more write transactions.

BRIEF DESCRIPTION OF THE DRAWINGS

Various embodiments in accordance with the present disclosure will be described with reference to the drawings, in which:

FIGS. 3A and 3B illustrate examples of transaction logs according to certain aspects of the disclosure;

DETAILED DESCRIPTION

Disclosed herein are techniques for enforcing in-order execution when a dependency exists between a write transaction and another write transaction. According to some aspects of the present disclosure, a write re-order buffer (WROB) is configured to receive incoming write transaction requests and to assign a group identifier (ID) to each request before forwarding the request to an interconnect fabric for delivery. If an incoming request involves a write transaction that depends on the results of an earlier write transaction, the WROB can assign the incoming request the same group ID as the earlier write transaction. The WROB can employ various methods for detecting whether a dependency exists, such as based on the destination address of a write transaction and/or based on the value of one or more transaction attributes included as part of a transaction request. In some implementations, enforcement of in-order execution with respect to transactions that are assigned the same group ID is performed by one or more interconnect fabrics that are coupled to the WROB. The interconnect fabric(s) can include routing logic configured to recognize that transactions with the same group ID should be executed in order of arrival and to route the requests for such transactions accordingly. Therefore the WROB can, by virtue of assigning group IDs, indicate to the interconnect fabric(s) which transactions are to be executed in-order.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
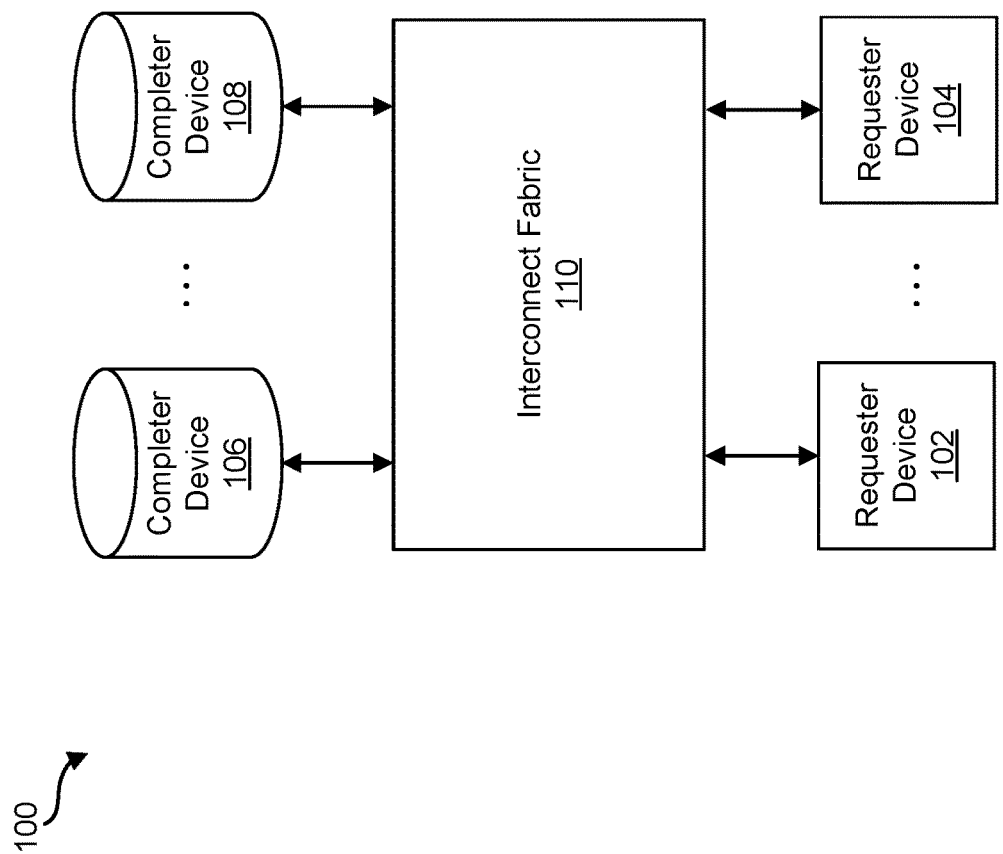
FIG. 1 illustrates an example of a computing environment in which write transactions can occur.

FIG. 1 illustrates an example of a computing environment 100 in which write transactions can occur. The computing environment 100 can be implemented as an integrated circuit, such as a system-on-chip (SoC). In other implementations, the computing environment 100 may be a distributed environment. For instance, the computing environment 100 may represent an architecture of a personal computer, where a microprocessor, a memory, and peripheral devices are coupled to each other through a motherboard.

As shown in FIG. 1, the computing environment 100 includes requester devices (e.g., requester devices 102 and 104) that are coupled to completer devices (e.g., completer devices 106 and 108) through an interconnect fabric 110. The interconnect fabric 110 routes messages between devices. In some instances, the message is a write transaction request sent from a requester device to a completer device. In other instances, the message is a response sent from a completer device to a requester device as confirmation of successful completion of a write transaction.

The devices 102, 104, 106, and 108 are computer devices that are involved in computing transactions. In some implementations, the requester devices 102 and 104 are processors, and the completer devices 106 and 108 are memory or devices that incorporate memory. Processors can include, for example, general-purpose processors such as central processing units (CPUs), or application-specific integrated circuits (ASICs). Processors can access memory resources to execute instructions that cause the processors to perform operations for executing software applications. The computing environment 100 can include one processor or multiple processors, where each processor is able to independently execute a set of instructions.

A single processor can have multiple processing cores, where each core can independently execute a set of instructions. A processing core is the computation engine of a processor, fetching instructions and data on every clock cycle, executing computations, outputting data, and making decisions about the next instructions to fetch. Having multiple processors and/or multiple processing cores provides a computer with one way to execute multiple applications at the same time. Thus, the requester devices 102 and 104 can each be individual processors or individual processing cores implemented in a single processor.

In addition to requester devices 102 and 104, the computing environment 100 can include other requester devices that can generate transactions for execution by the completer devices 106 and 108. For example, computing environment 100 can include a graphics processing unit (GPU), a Remote Network Interface (RNI), a Serial Peripheral Interface (SPI), a General Purpose Input/Output (GPIO) interface, a Direct Memory Access unit, a custom component, or any other component that is able to generate transactions to memory.

Although FIG. 1 illustrates only two requester devices 102 and 104 and two completer devices 106 and 108, embodiments are not limited to such configurations. Other embodiments having more or less requester devices and/or completer devices are envisioned herein. Further, although the computer devices in FIG. 1 are labeled as being either requester or completer, it will be understood that a computer device can be configured to, over time, operate as both a requester and a completer. For example, the requester device 102 may receive a request from the completer device 106. The request from the completer device 106 could involve a memory transaction or a non-memory related transaction.

Memory devices, e.g., completer devices 106 and 108 in FIG. 1, can be accessed by a processor for temporary storage of data being used by or operated on by the processor, e.g., requester device 102 or 104 in FIG. 1. For example, sections of code for applications that are currently running can be stored in the memory device, while sections of code that are not immediately needed can be stored elsewhere, such as on a hard drive disk. As another example, a file that is being read from and/or written to can be temporarily stored in the memory device, until the read or write operations are done, at which point the file can be transferred to the hard drive disk. Such memory devices are often referred to as Dynamic Random Access Memory (DRAM) because they are often implemented using a DRAM-based technology, such as Double Data Rate (DDR) RAM or Synchronous DRAM (SDRAM), among others. Some other types of memory devices that can be used by a processor include storage class memory (SCM), high bandwidth memory (HBM), and other types of memory that have different operating characteristics.

Interconnect fabric 110 connects requester devices 102, 104 to completer devices 106, 108 and provides avenues (propagation paths) through which data can be transmitted between the requester devices and completer devices. The data transmitted through the interconnect fabric 110 can include transaction requests and responses to transaction requests, among other things. Interconnect fabric 110 can include wiring and logic to efficiently move data between communication endpoints (e.g., between a requester and a completer), as discussed below with respect to FIG. 2A. Logic can include a hardware component, a software component, or a combination of both hardware and software components configured to perform one or more functions.

The propagation paths through the interconnect fabric 110 can have different latency, with the result that write requests and their responses may be re-ordered as they travel through the interconnect fabric 110. If there is a mechanism for specifying that ordering should be maintained, write transactions that are dependent can be executed in correct order, but a requester that is waiting for a response from a first destination (e.g., completer device 106) may be prevented from issuing a later transaction directed to the same or a different destination (e.g., completer device 108) until the requester receives the response from the first destination. The requester may hold off on sending the request for the later transaction even though the other destination could be available for handling the later transaction.

Reordering can introduce other problems. For instance, if multiple writes directed to the same destination address are performed out of order, a later (more recently received by the fabric 110) write can be overwritten by an earlier write. Consequently, the value that was written by the later write, which is expected to persist, is lost. Another problem with reordering occurs when multiple writes are directed to different destination addresses, but a first write references the result of a second write. In such instances, reordering can cause the first write to operate on incorrect data. For example, if a first write transaction references data that is written by a second write transaction, then the second write transaction must be completed before executing the first write transaction; otherwise the first write transaction may reference the wrong data. As described below in reference to FIGS. 2A and 2B, a WROB can be used to ensure in-order execution for write transactions that are dependent.

Figure 2A:
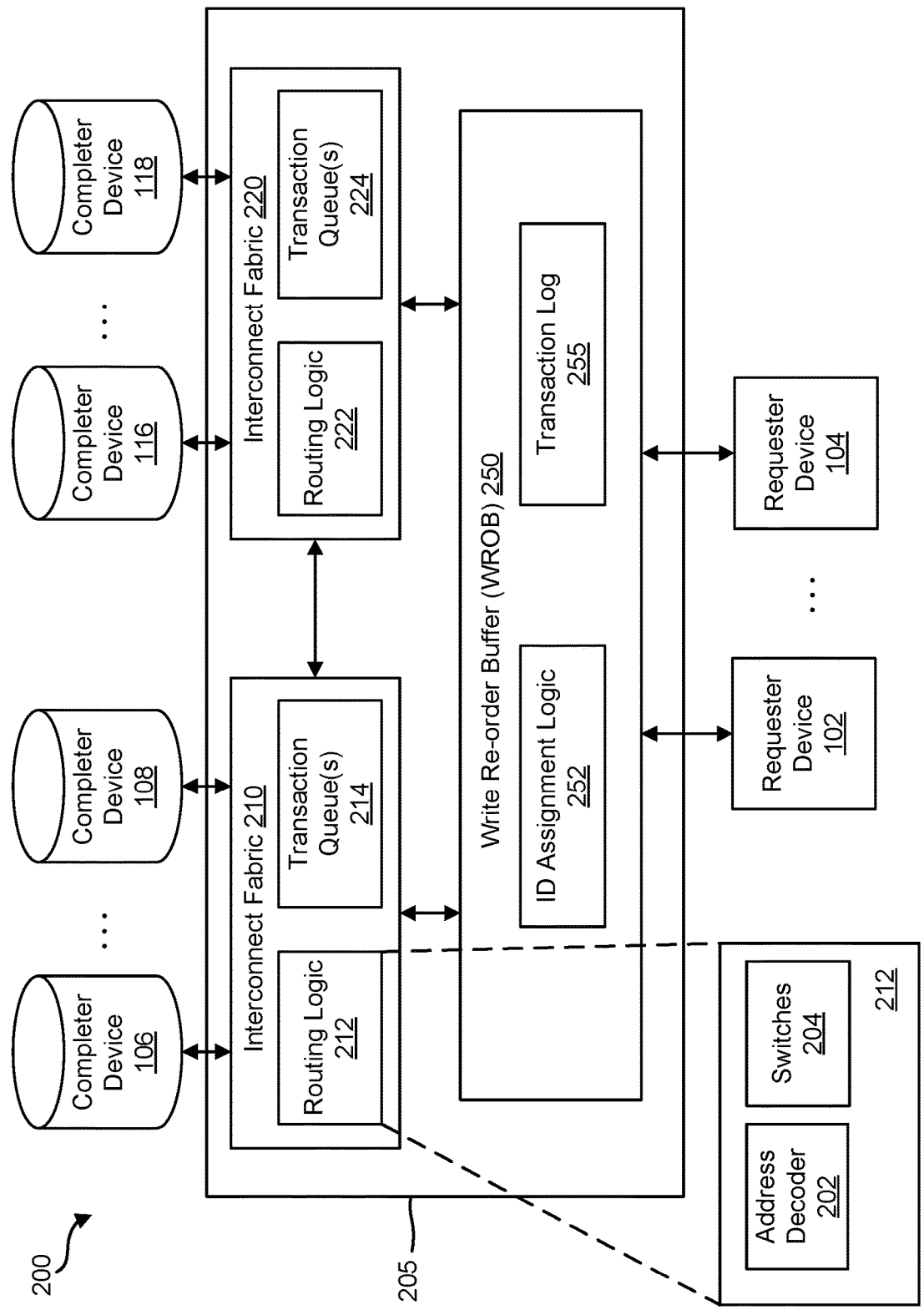
FIG. 2A illustrates an example of a computing environment according to certain aspects of the disclosure.

FIG. 2A illustrates an example of a computing environment 200 according to certain aspects of the disclosure. The computing environment 200 incorporates aspects of the computing environment 100 in FIG. 1, including requester devices 102, 104 and completer devices 106, 108. As with the computing environment 100, the computing environment 200 can be a centralized environment, such as an integrated circuit, or a distributed computing environment. In the example of FIG. 2A, the completer devices 106, 108 are coupled to an interconnect fabric 210, additional completer devices 116 and 118 are coupled to an interconnect fabric 220, and both interconnect fabrics 210, 220 are coupled to each other. Thus, the requester devices 102, 104 may communicate with the completer devices 106, 108, 116, and 118 through multiple interconnect fabrics. Together with a WROB 250, the interconnect fabrics 210, 220 may form a communications network 205.

The interconnect fabric 210 includes routing logic 212 and one or more transaction queues 214. Similarly, the interconnect fabric 220 includes routing logic 222 and one or more transaction queues 224. The completer devices in FIG. 2A can include memory (e.g., DRAM) and/or devices incorporating memory (e.g., a storage server). In some implementations, the memory made available by one or more of the completer devices in FIG. 2A is accessed using direct memory access (DMA) transactions. For example, a first DMA transaction may write to a destination address in a shared memory and a second DMA transaction that depends on the first DMA transaction may write to the same or a different destination address in the shared memory. DMA transactions involve less processor overhead compared to other methods of transferring data to or from memory, such as interrupts or processor-executed store instructions. Accordingly, the interconnect fabrics 210, 220 may include or be coupled to one or more DMA controllers (not shown).

The interconnect fabrics 210, 220 permit messages or data to be communicated between requesters and completers. In general, at least one path exists between each requester and each completer. In some instances, multiple paths, which may or may not overlap, connect a requester to a completer. In such instances, if a requester sends multiple transaction requests to the same destination (e.g., completer device 106), the transaction requests can travel in parallel to reach the destination. Further, a path between a requester and a completer may cross multiple interconnect fabrics, e.g., both the interconnect fabric 210 and the interconnect fabric 220. The interconnect fabrics 210, 220 can operate according to the same or different communications protocols. In some implementations, at least one of the interconnect fabrics 210, 220 implements an Advanced eXtensible Interface (AXI) interconnect. As such, at least some of the requester devices and at least some of the completer devices may include an AXI interface for communicating with an AXI interconnect.

Routing logic 212 is configured to direct messages to their intended destinations. Where multiple paths exist between a message source and a destination, the routing logic 212 can select a path based on latency and/or other criteria. The routing logic 212 can be implemented in hardware, software, or a combination of hardware and software. Accordingly, the routing logic 212 may include address decoders, multiplexers, demultiplexers, and/or other hardware or software components that determine where to send an incoming message. For example, as shown in FIG. 2A, the routing logic can include an address decoder 202 and switches 204. The address decoder 202 is configured to identify the endpoints of a transaction, e.g., through decoding an address of a requester device and/or an address of a completer device, based on address information included in a transaction request. In some implementations, decoded addresses are modified when requests propagate through the interconnect fabric 210, in order to differentiate between requests from different requesters. For instance, if a requester address is insufficient to uniquely identify one of four requester devices coupled to the same switch 204, the switch can append two additional bits to the requester address to indicate which of the four requesters the request came from. When the switch later receives a response confirming completion of the transaction, the response may reference the modified requester address. In such instances, the switch can remove the appended bits before forwarding the response toward the requester since the appended bits are longer needed.

Each switch 204 may be configured to handle transactions initiated by a set of requester devices. As such, the switches 204 may include arbitration logic that resolves conflicts between transaction requests, e.g., when multiple requesters send requests to the same responder concurrently. The routing logic 212 is further configured to enforce execution order based on group IDs. For example, the switches 204 can be configured to route, through the same propagation path, transactions that share the same group ID and that are from the same requester device. When a switch 204 receives a transaction for routing, the switch can check whether the transaction has the same group ID as any pending transaction that was sent through the switch 204 earlier and also whether the transaction is from the same requester device. If both these conditions are satisfied, the switch 204 can route the transaction using the same path that was used for the pending transaction with the same group ID. Otherwise, the switch 204 may select a different path if there are multiple paths to choose from. Accordingly, each switch 204 can be configured to track the group IDs of transactions that pass through the switch and to route the transactions accordingly.

As discussed below, the WROB 250 can assign group IDs such that write transactions which are linked by a dependency share the same group ID. When an incoming message arrives at the interconnect fabric 210 from the WROB 250, the routing logic 212 can check whether the message is a transaction request. If so, the routing logic 212 can extract a group ID from the message and determine, based on the group ID, whether out-of-order execution is permitted for the transaction.

In addition to the group ID, each transaction can have a transaction ID that, either alone or in combination with other information, uniquely identifies the transaction. For example, the transaction ID can be unique across all pending transactions and across all requester devices. Alternatively, the transaction ID can be unique on a per-requester basis, e.g., unique for all pending transactions that were issued by a particular requester device. In the case of a write transaction, both the transaction ID and the group ID can be assigned by the WROB 250. In some implementations, the transaction ID for a write transaction is assigned by some other entity, for example, by the requester of the write transaction. Although described with respect to write transactions, other types of transactions, such as read transactions or even non-memory transactions, can be assigned transaction IDs and/or group IDs.

Additionally, depending on implementation, transactions can have different identifiers assigned as the transactions travel through the network 205. For instance, a requester 102 may generate a first transaction ID for a write transaction, but the WROB 250 may assign the write transaction a second transaction ID for routing purposes. When the WROB 250 communicates information about the write transaction to the requester, e.g., a response confirming completion of the write transaction, the WROB 250 can use the first transaction ID since the requester may not necessarily recognize the second transaction ID. However, when the WROB 250 forwards the write transaction to an interconnect fabric for routing, the write transaction can refer to the second transaction ID instead of the first transaction ID. Accordingly, components within the computing environment 200 can be configured to associate different identifiers with the same transaction, and an identifier recognized or used by one component (e.g., requester 102) can potentially be different from an identifier recognized or used by another component (e.g., the WROB 250 and/or the interconnect fabrics 210 and 220). Further, depending on the transaction processing to be performed, the identifier may not always be a unique transaction ID.

The interconnect fabric 210 can be configured to track group IDs of pending write transactions. As described below, the WROB 250 can also monitor pending write transactions in connection with assigning group IDs. A pending write transaction is a write transaction that has not yet been completed, that is, the results of the write transaction have yet to be written to the destination address. Upon completion of a write transaction, the completer device that performed the write can send a response back to the requester to confirm completion. The response is communicated through an interconnect fabric, e.g., the interconnect fabric 210. When the routing logic 212 detects an incoming write transaction that shares the same group ID as a pending write transaction, the routing logic 212 can enforce in-order execution by, for example, waiting for a response confirming completion of the pending write transaction before forwarding the incoming write transaction to its destination.

Accordingly, the interconnect fabric 210 can maintain one or more transaction queues 214 that are accessible to the routing logic 212. In some implementations, each switch 204 can have a separate transaction queue. Alternatively or additionally, one or more transaction queues 214 can be a global queue shared by all the switches 204. The transaction queue(s) 214 operate as temporary storage for in-flight transactions, which are transactions that are enroute to their destinations. In-flight transactions include pending transactions, but pending transactions are not necessarily in-flight. For example, a pending transaction may have arrived at the completer device 106 after being routed through the interconnect fabric 210, but the pending transaction could still be awaiting execution at the completer device 106. In some implementations, the interconnect fabric 210 may maintain a separate transaction queue 214 for each requester device or for each requester-completer pair.

Another method by which the interconnect fabric 210 can enforce in-order execution is to send transaction requests that share the same group ID serially, using the same path. For instance, as indicated above, the switches 204 may be configured to select a different path for each group ID and to reuse the same path whenever an incoming transaction has been assigned the group ID associated with that path. In this way, a later transaction sharing the same group ID as an earlier transaction can be prevented from bypassing the earlier transaction, at least in the case where the requester and the completer involved in the earlier transaction are the same as in the later transaction.

When the routing logic 212 detects an incoming write transaction that does not share a group ID with any pending write transaction, the routing logic 212 can permit the write transaction to execute out-of-order. For example, the routing logic 212 can forward the incoming write transaction to its destination (e.g., one of the completer devices) without placing the write transaction onto a transaction queue 214. Whether or not the write transaction will be executed out-of-order may depend on the latency of the path taken to reach the destination, the workload of the destination, or other factors.

Interconnect fabric 220 is configured to operate in a similar manner to interconnect fabric 210. The routing logic 222 is analogous to the routing logic 212. Likewise, the transaction queue(s) 224 are analogous to the transaction queue(s) 214. Accordingly, the functionality described above with respect to the interconnect fabric 210 and its components also apply to the interconnect fabric 220.

As mentioned above, the WROB 250 can assign group IDs to write transactions. The assignment of group IDs can be performed using ID assignment logic 252 of the WROB 250. In FIG. 2A, WROB 250 is interposed between the requester devices 102, 104 and the interconnect fabrics 210, 220. In this configuration, the WROB 250 can intercept incoming messages to determine whether any incoming message involves a write transaction that is dependent on another write transaction. FIG. 2A is merely an example of one way in which the interconnect fabrics, the WROB, and the requester devices can be arranged with respect to each other. Other arrangements are also possible. For instance, in addition or as an alternative to being directly coupled to the WROB 250, the requester devices 102, 104 could be directly coupled to the interconnect fabric 210 and/or the interconnect fabric 220, in like manner to the completer devices 106, 108, 116, and 118. In that case, the WROB 250 may receive incoming messages through the interconnect fabrics 210, 220 rather than directly from a requester device.

To determine whether a write transaction is dependent on another write transaction, the WROB 250 can apply address-based and/or non-address based criteria. For example, if an incoming write transaction writes to the same destination address as a pending write transaction, then the WROB 250 can determine that the incoming write transaction is dependent on the pending write transaction. The destination addresses do not have to be identical in order for the WROB 250 to decide that a dependency exists. For instance, the WROB 250 may be configured to apply a bit mask to the destination address so that write transactions in which the destination addresses share one or more most significant bits (MSBs) are mapped to the same group even if the least significant bits (LSBs) are different. In this manner, write transactions that write to addresses with the same address range could potentially be assigned the same group ID.

Write transactions take many forms. A write transaction may involve writing a value specified in the write transaction request to a destination address, e.g., to a memory address associated with the completer device 106. A write transaction may involve writing a value stored at a source address to a destination address, where the source address and the destination address are memory addresses associated with the same or different completer devices. In some instances, a write transaction involves writing the result of a computation. Thus, a write transaction can write to a different destination address than another write transaction and still be dependent. For instance, a first write transaction may refer to data written by a second write transaction, but the first write transaction and the second write transaction can write to different addresses. As a specific example, the second write transaction can write a data value to a memory, and the first write transaction can write, to a different location in the memory, a completion descriptor for the second write transaction. Accordingly, the WROB 250 can use other items of information included in a write transaction request to identify a dependency. For instance, in the scenario where the first write transaction refers to a result of the second write transaction, the WROB 250 may determine that a source address of the first write transaction matches a destination address of the second write transaction.

Non-address based criteria can include transaction attributes. In some implementations, transaction attributes can be specified using one or more attribute fields in a write transaction request. The values of these attribute fields can be set by the initiator of the write transaction (e.g., a requester device) and may indicate whether there is a dependency. For instance, a requester device generating a set of write transactions can identify any dependencies prior to issuing the write transactions. If a dependency exists between two or more write transactions, the requester device can set an attribute field to the same value for the two or more write transactions. In some instances, a dependency can be indicated when a write transaction has a particular attribute value in combination with another write transaction having a particular attribute value. Thus, dependencies within a set of write transactions can be indicated by attribute value patterns (involving the same or different transaction attributes) across the set of write transactions.

The types of transaction attributes that can be specified may depend on the configuration of the interconnect fabrics 210, 220. Examples of transaction attributes that are supported in the ARM® Advanced Microcontroller Bus Architecture 3 (AXI3) protocol include bufferable/non-bufferable, cacheable/non-cacheable, read-allocate/no read-allocate, and write-allocate/no write-allocate, each of which can be specified through setting a corresponding flag bit. In some embodiments, one or more of above-listed AXI3 transaction attributes may be combined with additional transaction attributes to indicate the existence of a dependency. Examples of transaction attributes that are not part of the AXI3 protocol, but which may be used for indicating a dependency, include virtual machine (VM) ID, port ID, source ID associated with a requester, and destination ID associated with a completer. For instance, a VM ID can be an index value associated with a virtual function of a Peripheral Component Interconnect (PCI) based device (e.g., a requester or completer). PCI and virtual functions are described in further detail below in connection with FIG. 9. A port ID may, for example, be an identifier of a PCI or Ethernet port. Other transaction attributes are also possible depending on implementation.

WROB 250 may further include a transaction log 255. The transaction log 255 is a data structure that the WROB 250 uses to track the status of pending write transactions. The transaction log 255 can, for example, be organized as a table in which each table entry corresponds to a write transaction. Example implementations of transaction log 255 are shown in FIGS. 3A and 3B. In some implementations, the transaction log 255 only includes entries for pending write transactions. The transaction log 255 can be configured to list pending transactions in order of arrival. In some implementations, the WROB 250 may maintain a separate transaction log 255 for each requester device or requester-completer pair. Alternatively, the transaction log 255 can be a global log that can include entries for all requester devices that are communicatively coupled to the WROB. Status information included in the transaction log 255 may include the status of completion responses that have been received, or are yet to be received, by the WROB 250 from a completer device. Status information can also include the return status of such completion responses in order to indicate whether the WROB 250 has forwarded a completion response back to a requester device.

In some implementations, the WROB 250 may have a modular design in which each WROB module is configured to assign group IDs to transactions between a single requester and a single completer. The number of such modules depends on how many devices are in communication with each other. Thus, the WROB could include a first module that assigns group IDs to transactions sent from a first requester to a first completer. The WROB could further include a second module that assigns group IDs to transactions sent from the first requester to a second completer or, more generally, to transactions communicated between another requester-completer pair. An example of a modular implementation of WROB 250 is shown in FIG. 2B.

Figure 2B:
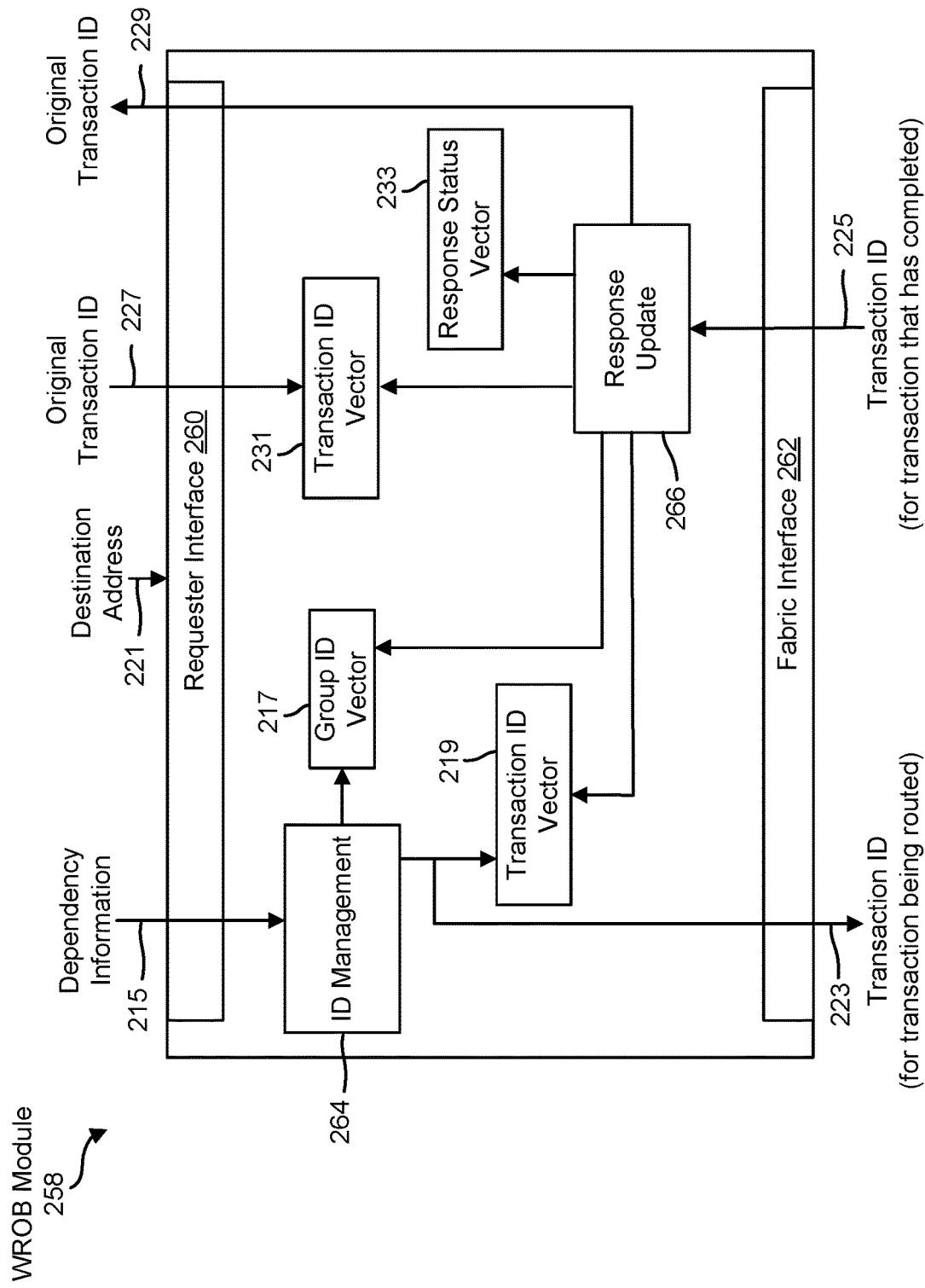
FIG. 2B illustrates an example of a modular component of a write re-order buffer, according to certain aspects of the disclosure.

FIG. 2B illustrates an example of a WROB module 258 according to certain aspects of the disclosure. The module 258 can be implemented in hardware, software, or a combination of hardware and software. For instance, the module 258 can be implemented as an IC chip that, together with IC chips corresponding to additional modules 258, form the WROB 250. Alternatively, the WROB 250 can be a single IC chip with circuitry corresponding to multiple instances of the module 258. As shown in FIG. 2B, the module 258 includes a requester interface 260 and a fabric interface 262. The interfaces 260 and 262 can be configured according to the same or different communications protocols. In some implementations, both the requester interface 260 and the fabric interface 262 are AXI interfaces.

The module 258 receives, through the requester interface 260, information for a write transaction. The information for the write transaction can include, among other things, dependency information 215 and a destination address 221 for the write transaction. The dependency information 215 can be any information that is usable for determining whether an incoming write transaction is dependent on another write transaction. For example, the dependency information 215 can be an identifier or a transaction attribute that is set by a requester to indicate that the write transaction is dependent. In some implementations, the WROB may even support the ability of a requester to specify group IDs for transactions issued by the requester.

The module 258 includes ID management logic 264 configured to maintain a group ID vector 217. The ID management logic 264 can implement the ID assignment logic 252 in FIG. 2A and may include one or more processing units that determine a group ID for each write transaction received through the requester interface 260. The group ID vector 217 and other data structures maintained by the module 258 can be implemented using storage devices, e.g., content-addressable memory or hardware registers.

Each entry in the group ID vector 217 can represent a different group ID, with the group ID serving as an index so that the size of the group ID vector 217 indicates how many transaction groups have been formed. For example, if all pending write transactions belong to the same group, then the group ID vector 217 may only contain a single entry corresponding to index [0]. Additionally, each entry may include a value indicating the total number of pending write transactions that have been assigned to the group ID associated with the entry. The ID management logic 264 can be configured to perform a lookup into the group ID vector 217 each time a write transaction is received, in order to determine whether to allocate a new entry in the group ID vector (e.g., when the transaction is independent) or to use an existing entry (e.g., when the transaction depends on an earlier write transaction). When implemented in hardware, the ID management logic 264 may include a comparator that checks whether the group ID assigned to an incoming write transaction matches the group ID associated with an existing entry in the group ID vector 217. If there is a match, the ID management logic 264 increments the value of the existing entry. Otherwise, the ID management logic 264 can allocate a new entry with a starting value of one.

In addition to the group ID vector 217, the ID management logic 264 may be configured to maintain a transaction ID vector 219. Each entry in the transaction ID vector 219 can correspond to a separate write transaction and is associated with a respective transaction ID, e.g., a transaction ID 223, as shown. The number of entries in the transaction ID vector 219 indicates the total number of pending write transactions for which a response has not yet been returned to the requester. In some implementations, the transaction ID vector 219 is structured as one or more linked lists, where each transaction in a linked list has been assigned the same group ID. Transactions can be linked according to the order in which the module 258 receives the transactions, e.g., so that an entry in the transaction ID vector 219 includes a pointer to the entry for an immediately preceding transaction in the same group and/or a pointer to the entry for an immediately following transaction in the same group. In this manner, the transaction ID vector 219 may be used to determine the order in which responses are to be returned to the requester.

As shown in FIG. 2B, when a write transaction is sent through the fabric interface 262, the module 258 can communicate a corresponding transaction ID (e.g., the transaction ID 223) to the interconnect fabric. Similarly, when a write transaction is completed, the module 258 can receive, through the fabric interface 262, a response including a transaction ID 225 of the completed transaction. The transaction ID 225 is processed by response update logic 266 to update the transaction ID vector 219 and the group ID vector 217. The response update logic 266 is configured to, in conjunction with returning a response to the requester, deallocate the entry in the transaction ID vector 219 corresponding to the transaction having the transaction ID 225. The module 258 can be configured to return responses in order. Accordingly, the response update logic 266 may deallocate an entry from the transaction ID vector 219 when the transaction ID 225 matches the transaction ID for the entry at the head of a linked list in the transaction ID vector 219.

In the example of FIG. 2B, the transaction ID 223 can be a non-unique ID that, for routing purposes, is functionally equivalent to the group ID by which the entries in the group ID vector 217 are indexed. In other words, the transaction ID 223 can be used as a substitute for the group ID determined by the ID management logic 264, so that transactions with the same transaction ID 223 are treated as being part of the same transaction group. Accordingly, it is not strictly required that the WROB communicate both a transaction ID and a group ID to the interconnect fabric, nor is it required that the WROB communicate a unique identifier to the interconnect fabric for each individual transaction. Depending on implementation, a single identifier for each transaction may suffice. For this reason, the outputting of a separate group ID through the fabric interface 262 has been omitted from FIG. 2B.

Response update logic 266 is further configured to deallocate entries from the group ID vector 217. Deallocation from the group ID vector 217 can be performed based on the response update logic 266 determining that there are no more entries with the same group ID. This determination can be performed by, for example, detecting that the head of a linked list in the transaction ID vector 219 matches the tail of the linked list.

In the example of FIG. 2B, the requester is configured to assign its own transaction IDs, e.g., an original transaction ID 227. The module 258 can maintain a separate transaction ID vector 231 that is structured and updated in a similar manner to the transaction ID vector 219, for example, using one or more linked lists. When the response update logic 266 returns a response to the requester, the response can reference the corresponding requester-specified transaction ID, e.g., an original transaction ID 229.

As part of returning a response to the requester, the response update logic 266 can also update a response status vector 233 containing entries that indicate whether a response has been returned for any pending write transaction. The response status vector 233 can be omitted in implementations where the WROB is configured to send an early response (discussed below in reference to FIG. 3B). In order to coordinate allocation and deallocation of entries, the transaction ID vector 219, the transaction ID vector 231, and the response status vector 233 can share an indexing scheme in which entries that relate to the same transaction are mapped to the same index value. For instance, an entry in the transaction ID vector 219 with index [2] would relate to the same transaction as an entry in the transaction ID vector 231 with index [2].

FIG. 3A illustrates an example transaction log 300 according to certain aspects of the disclosure. The transaction log 300 may implement the transaction log 255 in FIG. 2A and includes fields corresponding to transaction ID, group ID, source address, and destination address. The transaction log 300 also includes fields that indicate whether a transaction is dependent on another transaction, as well as the response status (received and returned) for each transaction. Each row of the transaction log 300 corresponds to a separate entry for an individual write transaction. As shown in FIG. 3A, each transaction can be assigned a unique transaction ID, but transactions that are linked by a dependency are assigned the same group ID. The entries in the transaction log 300 are arranged in order of arrival of the transactions. In some implementations, the transaction log 300 can include an order number or other parameter that indicates the relative order in which the WROB received the transactions, in which case the entries may not be arranged in order of arrival. FIG. 3A and FIG. 3B (discussed below) are provided merely to illustrate examples of transaction information that a WROB is capable of tracking. Depending on implementation, a transaction log can include more or fewer categories of information, or a different category of information than that shown in FIGS. 3A and 3B. Further, as indicated in the discussion of FIG. 2B above, the information that forms a transaction log can be stored in a distributed manner using a combination of data structures.

In the example of FIG. 3A, transactions D0 and D1 are independent and write to different destination addresses. Transaction D2 is dependent on both D0 and D1 because D2 references the results of D0 and D1, as indicated by the source address field for D2 matching the destination addresses for D0 and D1. For example, D2 could be a transaction that writes a completion descriptor for transactions D0 and D1, where the completion descriptor includes the values written to the destination addresses of D0 and D1 (0xABC and 0xBCD), along with other metadata describing D0 and D1. Additionally, transaction D3 is independent of D0, D1, and D3 and, accordingly, has been assigned a different group ID.

The transaction log 300 can be updated by a WROB (e.g., WROB 250) when the WROB receives a response from the destination (e.g., one of the completer devices in FIG. 2A). In FIG. 3A, a response has been received for D0, thereby indicating to the WROB that D0 has finished writing to its respective destination address. The WROB can also update the transaction log 300 when the WROB returns a response to a requester. As shown, a response has been returned for D0 but not D1, D2, or D3. In some implementations, the WROB is configured to return a response as soon as the response is received by the WROB. Accordingly, the received status of the responses can be omitted from the transaction log in some instances. The WROB may delete entries corresponding to transactions for which a response has been returned (in this example, D0). The deletion can be performed after the response has been returned to the requester or after the transaction log 300 reaches a maximum number of entries.

FIG. 3B illustrates an example transaction log 302 according to certain aspects of the disclosure. The transaction log 302 shows an example of an early response for a pair of transactions D4 and D5. Transaction D5 is dependent on D4 because D4 and D5 write to the same destination address (0xCBE). However, D4 does not depend on D5 since D4 is an earlier write. In this example, the WROB has received a response for D4 and has also returned a response 310 for D4. Additionally, the WROB has not yet received a response for D5 but nevertheless has sent a response 312 back to the requester. At this point in time, D5 has not actually completed, but the response 312 indicates completion to the requester so that, from the perspective of the requester, D5 has successfully written to its destination address. Accordingly, when configured to send early responses, a WROB can return a response to a requester upon receiving a write transaction initiated by the requestor, irrespective of whether the WROB has actually received a response for the write transaction and irrespective of whether the write transaction is dependent on another write transaction. For example, the WROB may send the response immediately after forwarding the write transaction to an interconnect fabric for routing. The sending of an early response is significant because the requester need not wait for actual completion in order to issue a subsequent write transaction. For example, D4 and D5 could be transactions issued by the requester device 102, and the requester device 102 may expect that the responses for D4 and D5 will arrive in the same order in which D4 and D5 were sent by requester device 102. In the absence of an early response for D4, the requester device may delay sending D5 while D4 is still pending. Similarly, in the absence of early responses for D4 and D5, the requester device 102 may wait to receive responses for both D4 and D5 before issuing the next write transaction, e.g., a transaction that depends on D4 and/or D5.

Early responses are made possible due to group ID based enforcement of in-order execution for write transactions that are dependent. Without such enforcement, the WROB and/or the requester device may wait to receive a response for a first write transaction to confirm that the first write transaction has completed before sending a second write transaction that is dependent on the first write transaction to an interconnect fabric for routing, thereby ensuring that the first write transaction and the second write transaction are executed in order. Consequently, the response for the second write transaction could potentially be forwarded by the WROB back to a requester (e.g., the requester of both the first write transaction and the second write transaction) with a substantial delay. In contrast, since in-order execution is guaranteed when write transactions are assigned the same group ID, the WROB can return a response before the WROB itself receives the response, thereby potentially saving the latency of waiting for the response. In some implementations, the WROB may be configured to return a response for a write transaction to the requester immediately upon sending the write transaction to an interconnect fabric for routing.

Figure 4:
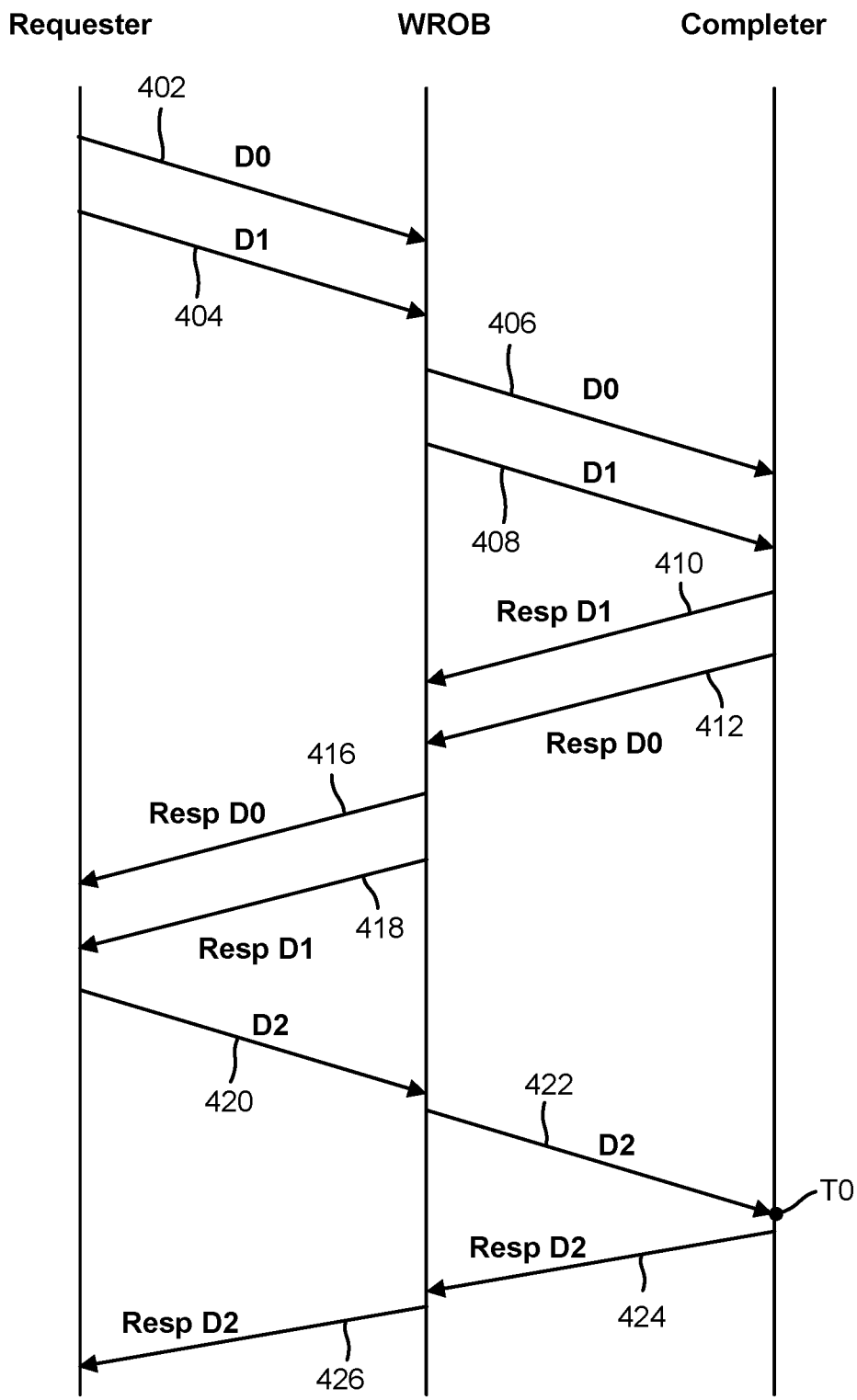
FIG. 4 illustrates a message flow between a requester, a write re-order buffer, and a completer in the absence of group ID based enforcement of execution order, according to certain aspects of the disclosure.

FIG. 4 illustrates a message flow between a requester, a WROB, and a completer in the absence of group ID based enforcement of execution order, according to certain aspects of the disclosure. In the example of FIG. 4, write transactions D0, D1, and D2 may correspond to D0, D1, and D2 as discussed above in reference to FIG. 3A. In particular, write transaction D2 in FIG. 4 is dependent on write transactions D0 and D1. At 402, the requester issues a write transaction request for D0. Since D0 and D1 are independent, the requester can, at 404, issue a write transaction request for D1 without waiting for a response for D0. For instance, the request for D1 can be sent immediately after sending the request for D0. Alternatively, the request for D0 and the request for D1 could be sent in parallel. The requests in 402 and 404 are received by the WROB.

At 406, the WROB forwards the request for D0 to the completer through one or more interconnect fabrics (not shown). Similarly, at 408, the WROB forwards the request for D1 to the completer. The request in 406 can be forwarded along the same or a different path than the request in 408.

At 410, the WROB receives the response for D1 through the one or more interconnect fabrics. Similarly, at 412, the WROB receives the response for D0 through the one or more interconnect fabrics. The response for D0 is received after the response for D1. This may be due to the completer executing D1 sooner, for example, because the request in 408 arrived at the completer before the request in 406. Another reason may be that the response for D0 was sent through a path with longer latency compared to the path over which the response for D1 was sent. Thus, the WROB receives the responses for D0 and D1 out of order.

Although the WROB receives the responses for D0 and D1 out of order, the WROB can be configured to return the responses in-order, as may be expected by the requester. Accordingly, at 416, the WROB forwards the response for D0 to the requester before forwarding the response for D1 at 418. The WROB can temporarily store responses that are received out of order so that the responses can be returned to the requester in-order. For example, in some implementations, the WROB 250 may include memory for storing incoming responses in preparation for forwarding to requester devices; and the WROB 250 may forward the stored responses beginning with the response for the oldest pending transaction. Such storage of incoming responses is optional and may be omitted when the WROB is configured to send an early response.

At 420, upon receiving the responses for D0 and D1, the requester issues a request for D2. The requester may wait for these responses before sending the request for D2 because, as the source of the requests for all three transactions, the requester is aware that D2 depends on D0 and D1 and, therefore, that D0 and D1 need to be completed first.

At 422, the WROB receives the request for D2 and forwards the request to the completer. Subsequently, at 424, the WROB receives the response for D2 from the completer. Then, at 426, the WROB forwards the response for D2 to the requester. As indicated in the example of FIG. 4, in the absence of group ID based enforcement of in-order execution for write transactions that are dependent, delay may be incurred in waiting for responses confirming completion of earlier transactions which later transactions (in this example, D2) depend on.

Figure 5:
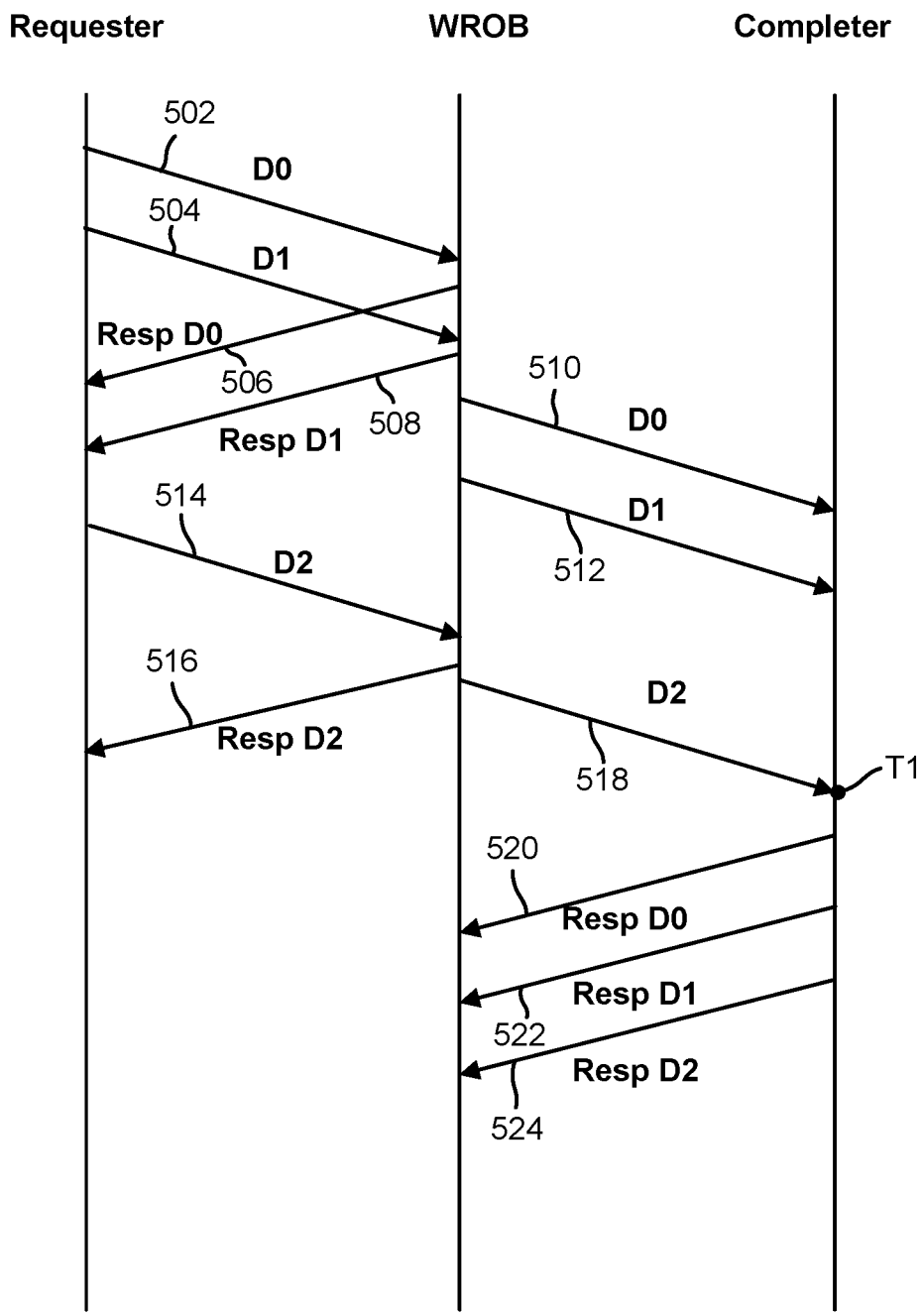
FIG. 5 illustrates a message flow between a requester, a write re-order buffer, and a completer, using group ID based enforcement of execution order, according to certain aspects of the disclosure.

FIG. 5 illustrates a message flow between a requester, a WROB, and a completer, using group ID based enforcement of execution order, according to certain aspects of the disclosure. In the example of FIG. 5, write transactions D0, D1, and D2 are the same as described above in reference to FIGS. 4. At 502 and 504, the requester issues requests for D0 and D1, respectively. The requests in 502 and 504 can be sent to the WROB in the same manner as discussed above with respect to 402 and 404 in FIG. 4.

At 506, the WROB sends an early response for D0, for example, immediately after receiving the request that was sent in 502. Similarly, at 508, the WROB sends an early response for D1.

At 510 and 512, the WROB forwards the request for D0 and the request for D1 to the completer, respectively. The request in 510 can be forwarded along the same or a different path than the request in 512. In FIG. 5, 510 occurs after 506, and 512 occurs after 508. However, the order in which the WROB returns an early response relative to forwarding the request for routing may be different in some implementations. For example, the WROB may return the early response for D0 after forwarding the request for D0 to the completer.

At 514, after receiving the responses for D0 and D1 from the WROB, the requester issues the request for D2. The requester is able to issue the request for D2 because the requester is operating under the assumption, based on the responses sent in 506 and 508, that D0 and D1 have completed even though D0 and D1 are, in fact, still pending at this time.

At 516, the WROB sends an early response for D2 after receiving the request in 514. As with the early responses in 506 and 508, the response in 516 can be sent immediately or a short time after the WROB receives the corresponding request.

At 518, the WROB forwards the request for D2 to the completer. The request in 518 can be forwarded along the same or a different path than the requests in 510 and 512.

At 520, the WROB receives the response for D0 from the completer. Similarly, at 522 and 524, the WROB receives the responses for D1 and D2, respectively. Thus, in this example, transactions D0, D1, and D2 are completed after responses for all three transactions have been sent from the WROB to the requester. The latency saved as a result of sending the early responses corresponds to the time difference between the request for D2 in FIG. 4 and the request for D2 in FIG. 5, e.g., as measured based on arrival time at the completer, labeled T0 in FIGS. 4 and T1 in FIG. 5.

Although FIG. 5 shows the responses for D0, D1, and D2 arriving at the WROB in the same order as which the WROB forwarded the requests in 510, 512, and 518, this is not always the case. Instead, the WROB may receive the responses in 520, 522, and 524 in a different order. Regardless of any reordering of the responses, the WROB can return the responses to the requester in-order. Moreover, irrespective of the order in which the WROB receives the responses, transactions D0, D1, and D2 will be executed in order based on sharing the same group ID.

Figure 6:
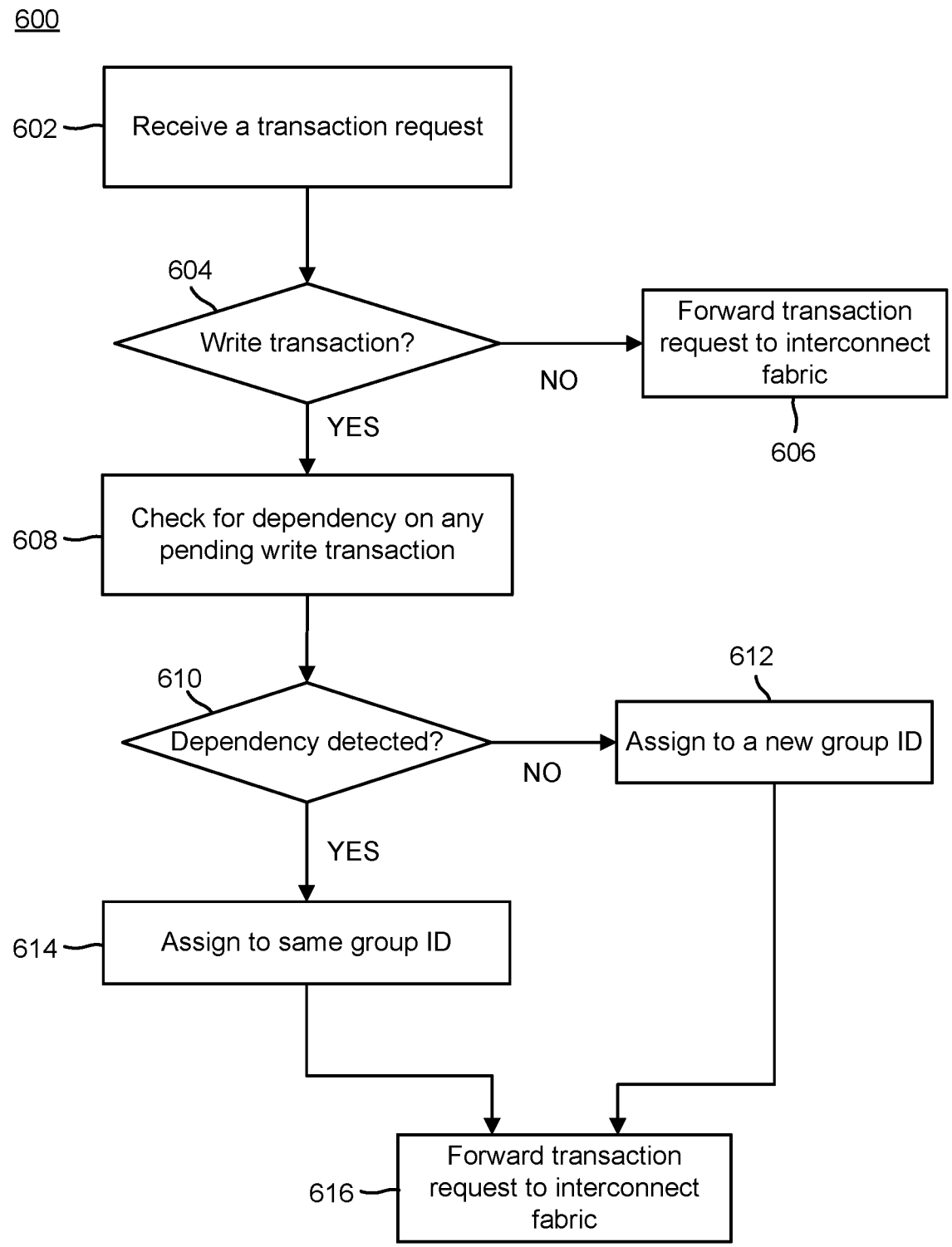
FIG. 6 is a flow diagram of a method for processing incoming transaction requests according to certain aspects of the disclosure.

FIG. 6 is a flow diagram of a method 600 for processing incoming transaction requests according to certain aspects of the disclosure. The method 600 can be performed by a WROB that is communicatively coupled to one or more interconnect fabrics, e.g., the WROB 250. At 602, the WROB receives a transaction request from a requester device. Depending on implementation, the WROB may receive the transaction request directly or after routing through the one or more interconnect fabrics.

At 604, the WROB determines whether the transaction that is the subject of the request in 602 is a write transaction. If the transaction is not a write transaction (e.g., a read transaction on a non-memory transaction) the WROB can, at 606, forward the transaction request to an interconnect fabric for routing to an intended destination and without performing further processing with respect to this transaction. Otherwise, if the transaction is a write transaction, the method proceeds to 608.

At 608, the WROB checks whether the transaction that is the subject of the request in 602 is dependent on any pending write transaction. The determination in 604 can be performed using ID assignment logic 252 which, as discussed above, may be configured to identify dependencies using address based and/or non-address based criteria (e.g., transaction attributes). Further, the check in 608 can be performed using a transaction log that permits the WROB to track the status of any pending write transactions, e.g., the transaction log 300 or 302.

At 610, the WROB determines, based on the result of the check in 608, whether a dependency exists with respect to the transaction. If there is no dependency, then the WROB can assign a new group ID to the transaction, at 612. Assigning a new group ID permits the transaction to execute out of order, which can potentially speed up completion of the transaction. The new group ID can be selected from a pool of available (currently unassigned) group IDs. In some implementations, the WROB may be configured to track usage of group IDs and to balance the number of times group IDs are assigned. Further, in some implementations, the WROB may be configured to return a group ID to the pool in response to determining that all transactions assigned to the group ID have been completed.

If the WROB determines that the transaction is dependent on one or more pending write transactions, the WROB assigns, at 614, the same group ID as the group ID that was assigned to the pending write transaction(s). Assigning the same group ID causes the transactions in the group to execute in order of arrival, i.e., the order in which the transactions are passed into an interconnect fabric. As shown, for example, in FIG. 5, the order in which the WROB receives the transactions may also be the order in which the WROB forwards the transactions for routing through an interconnect fabric. Therefore, order of arrival at the WROB may be the same as order of arrival at the interconnect fabric.

At 616, after assigning a group ID in 612 or 614, the WROB forwards the transaction request to the interconnect fabric for routing.

Figure 7:
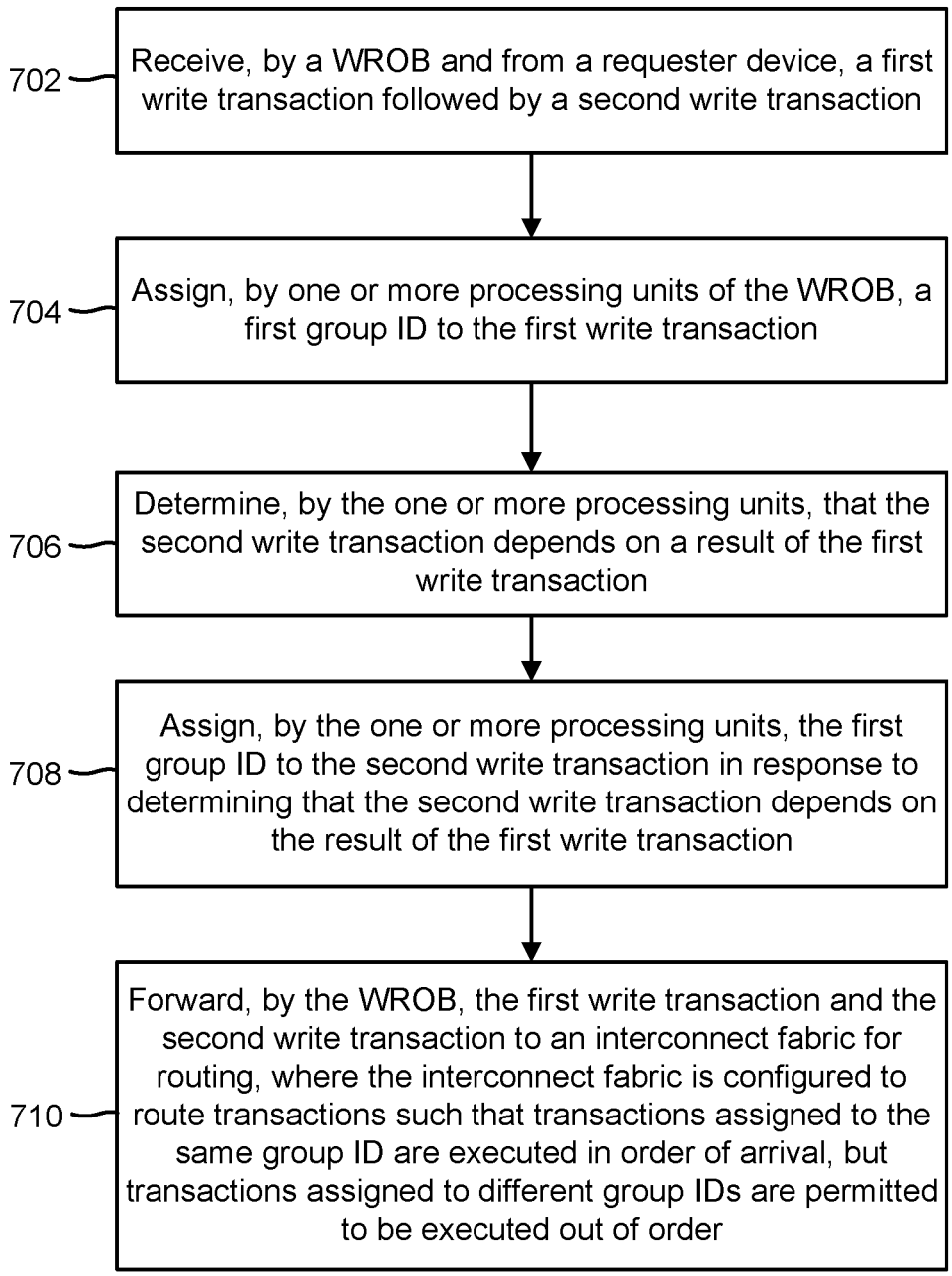
FIG. 7 is a flow diagram of a method for processing dependent write transactions according to certain aspects of the disclosure.

FIG. 7 is a flow diagram of a method 700 for processing dependent write transactions according to certain aspects of the disclosure. The method 700 may incorporate aspects of the method 600 described above and can be performed by a WROB that is communicatively coupled to one or more interconnect fabrics, e.g., the WROB 250. At 702, the WROB receives, from a requester device, a first write transaction followed by a second write transaction. In the context of the method 700, the write transactions are received in the form of requests for execution of their corresponding transactions. As such, the first write transaction and the second write transaction may include data values and/or other information used to process the transactions, such as references to memory addresses or, in some instances, transaction attributes. In the example of FIG. 7, the first write transaction and the second write transaction are transactions to be executed by one or more completer devices that are coupled to the requester device through an interconnect fabric. In some instances, the first write transaction and the second write transaction are destined for the same completer device. Further, the second write transaction is a transaction that depends on a result of the first write transaction.

The WROB may receive the second write transaction after the first write transaction because the requester device, as the initiator of both write transactions, may be aware that the second write transaction depends on the first write transaction. As such, the requester device may wait for a response confirming completion of the first write transaction before sending the second write transaction. As described above in reference to FIG. 5, the WROB may be configured to send an early response in order to expedite the sending/issuance of a dependent write transaction. Importantly, the requester device need not be aware that the response is an early response. Since in-order execution can be ensured based on assigning the same group ID, the requester device can treat an early response in the same way as a regular response.

In implementations where the WROB is configured to send early responses, a requester device may issue later transactions under the assumption that earlier transactions have completed successfully. However, it may not always be the case that an earlier transaction completed despite the WROB having sent a response indicating completion. For example, the requester device in the example of FIG. 7 may have issued the second write transaction after receiving an early response for the first write transaction. Based on the completer device handling the first write transaction indicating that the first write transaction did not complete successfully, the WROB may signal an error to the requester device. For instance, the WROB can trigger an interrupt, set an error bit in a hardware register accessible to the requester device, or send an error message to the requester device. In some implementations, the WROB may initiate a system reboot or take some other action to prevent further processing of the second write transaction.

At 704, the WROB assigns a first group ID to the first write transaction. The assignment can be performed by one or more processing units of the WROB, for example, a processor implementing the ID assignment logic 252 in FIG. 2A. Here, since the first write transaction is not dependent on any pending write transactions, the WROB may select the first group ID from a pool of unassigned group IDs, so that the first group ID is not shared with any pending write transactions.

At 706, the one or more processing units of the WROB determine that the second write transaction depends on the result of the first write transaction. As discussed above, this determination can be performed using address-based and/or non-address based criteria (e.g., transaction attributes). For example, the one or more processing units may detect that the first write transaction and the second write transaction write to the same destination address, or that the second write transaction references the destination address of the first write transaction.

At 708, the one or more processing units of the WROB assign the first group ID to the second write transaction in response to the determination in 706. As part of assigning the first group ID to the second write transaction, the one or more processing units may insert the first group ID into the second write transaction, for example, in a header of a message containing information for the second write transaction. Likewise, the one or more processing units may insert the first group ID into the first write transaction as part of the assignment in 704.

At 710, the WROB forwards the first write transaction and the second write transaction to an interconnect fabric for routing. The interconnect fabric is configured to route transactions in such a way that transactions assigned to the same group ID are executed in order of arrival, but transactions assigned to different group IDs are permitted to be executed out of order. In the example of FIG. 7, since the WROB receives the first write transaction before the second write transaction, the WROB can forward the first write transaction sooner so that the first write transaction arrives at the interconnect fabric before the second write transaction. The enforcement of in-order execution for dependent write transactions can be implemented through routing logic of the interconnect fabric (e.g., routing logic 212 or 222). In some implementations, enforcement of in-order execution involves placing write transactions that share the same group ID into a queue (e.g., transaction queue 214 or 224) so that later write transactions are dequeued for routing only after responses have been received by the interconnect fabric for earlier transactions with the same group ID. Other methods of enforcing in-order execution based on group ID are also possible depending on the configuration of the interconnect fabric.

Figure 8:
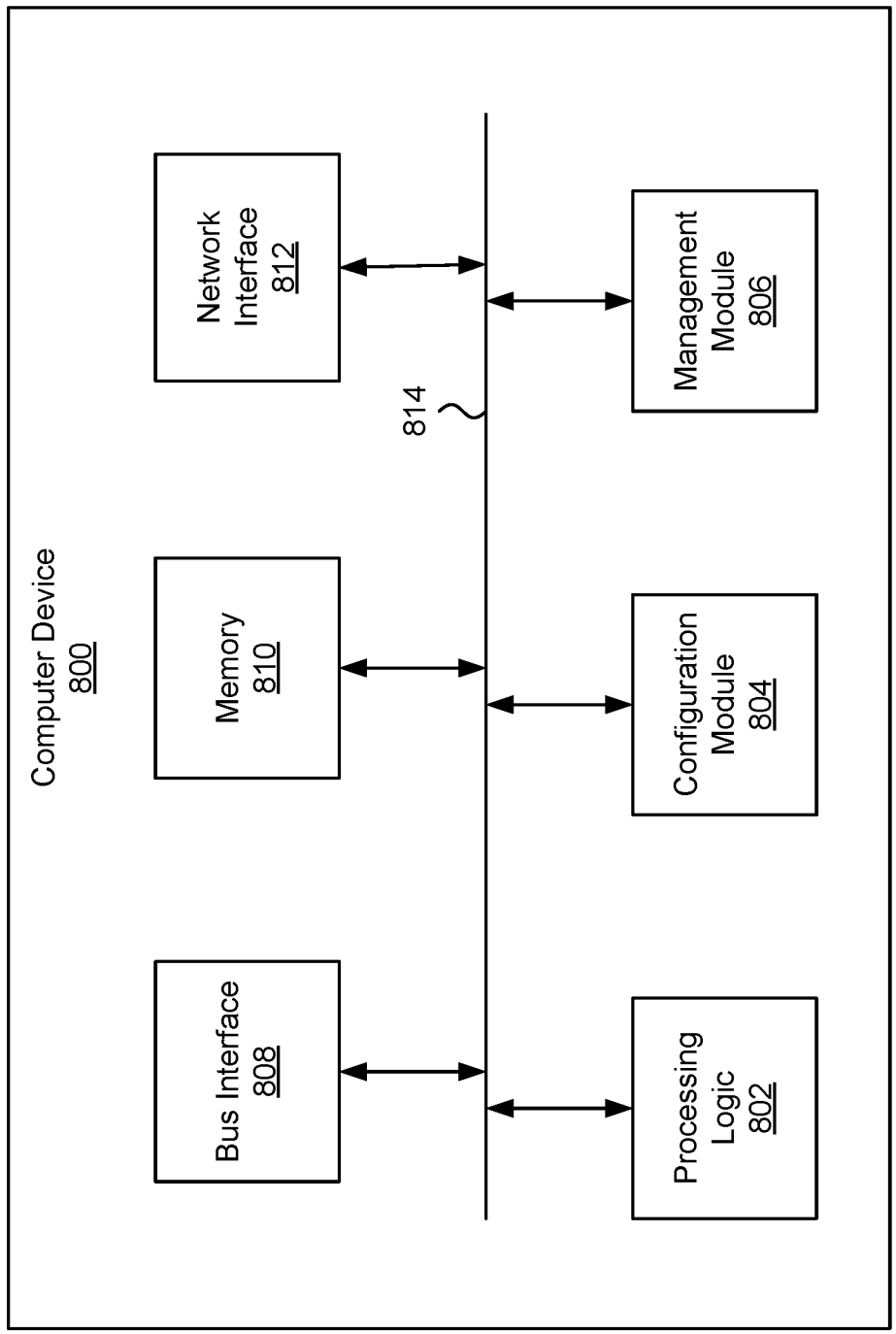
FIG. 8 illustrates an example of a computer device, according to certain aspects of the disclosure.
Figure 9:
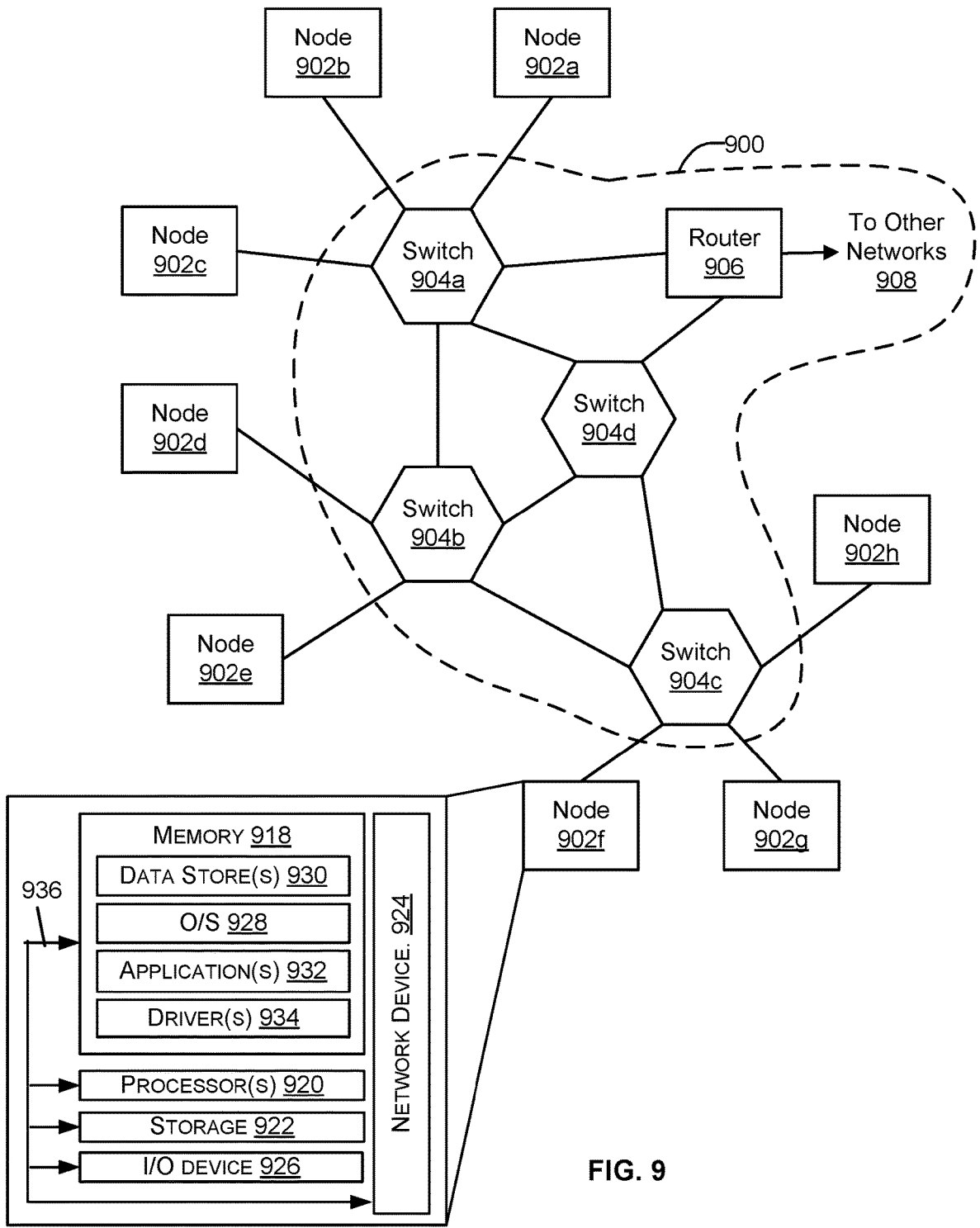
FIG. 9 illustrates an example architecture for features and systems described herein that includes one or more service provider computers and/or a user device connected via one or more networks, according to certain aspects of the disclosure.

FIGS. 8 and 9 illustrate examples of computing environments in which embodiments of the systems, apparatus, and methods described above can be implemented. In some implementations, a requester device, a completer device, and/or a WROB may correspond to a computer device with networking capabilities, as shown in FIG. 8, so that transactions are communicated using network packets. For example, a requester device can be a computer device that sends a packetized message containing a request for a write transaction, where the packetized message is sent to an interconnect fabric through a bus interface or a network interface of the computer device. As another example, requester devices and completer devices may correspond to nodes that are coupled to one or more interconnect fabrics, where the interconnect fabric(s) form a network that includes switches and routers, as shown in FIG. 9.

FIG. 8 illustrates an example of a computer device 800. Functionality and/or several components of the computer device 800 may be used without limitation with other embodiments disclosed elsewhere in this disclosure, without limitations. A computer device 800 may facilitate processing of packets and/or forwarding of packets from the computer device 800 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computer device 800 may be the recipient and/or generator of packets. In some implementations, the computer device 800 may modify the contents of the packet before forwarding the packet to another device. The computer device 800 may be a peripheral device coupled to another computer device, a switch, a router, or any other suitable device enabled for receiving and forwarding packets.

In one example, the computer device 800 may include processing logic 802, a configuration module 804, a management module 806, a bus interface module 808, memory 810, and a network interface module 812. These modules may be hardware modules, software modules, or a combination of hardware and software. In certain instances, modules may be interchangeably used with components or engines, without deviating from the scope of the disclosure. The computer device 800 may include additional modules, not illustrated here, such as components discussed with respect to the nodes disclosed in FIG. 9. In some implementations, the computer device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions, or any other circuitry configured to perform logical arithmetic and floating point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the computer device 800, while in other cases some or all of the memory may be external to the computer device 800. The memory 810 may store an operating system comprising executable instructions that, when executed by the processing logic 802, provides the execution environment for executing instructions providing networking functionality for the computer device 800. The memory may also store and maintain several data structures and routing tables for facilitating the functionality of the computer device 800.

In some implementations, the configuration module 804 may include one or more configuration registers. Configuration registers may control the operations of the computer device 800. In some implementations, one or more bits in the configuration register can represent certain capabilities of the computer device 800. Configuration registers may be programmed by instructions executing in the processing logic 802, and/or by an external entity, such as a host device, an operating system executing on a host device, and/or a remote device. The configuration module 804 may further include hardware and/or software that control the operations of the computer device 800.

In some implementations, the management module 806 may be configured to manage different components of the computer device 800. In some cases, the management module 806 may configure one or more bits in one or more configuration registers at power up, to enable or disable certain capabilities of the computer device 800. In certain implementations, the management module 806 may use processing resources from the processing logic 802. In other implementations, the management module 806 may have processing logic similar to the processing logic 802, but segmented away or implemented on a different power plane than the processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the computer device 800 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 812 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computer device 800 may include multiple network interface modules, each configured to communicate with a different network. For example, in these implementations, the computer device 800 may include a network interface module for communicating with a wired Ethernet network, a wireless 802.11 network, a cellular network, an Infiniband network, etc.

The various components and modules of the computer device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 9.

FIG. 9 illustrates a network 900, illustrating various different types of computer devices 800 of FIG. 8, such as nodes comprising the computer device, switches, and routers. In certain embodiments, the network 900 may be based on a switched architecture with point-to-point links. As illustrated in FIG. 9, the network 900 includes a plurality of switches 904a-904d, which may be arranged in a network. In some cases, the switches are arranged in a multi-layered network, such as a Clos network. A computer device 800 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904a-904d may be connected to a plurality of nodes 902a-902h and provide multiple paths between any two nodes.

The network 900 may also include one or more computer devices 800 for connection with other networks 908, such as other subnets, LANs, wide area networks (WANs), or the Internet, and may be referred to as routers 906. Routers use headers and forwarding tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904a-904d and router 906, if present, may be referred to as a switch fabric, a fabric, a network fabric, or simply a network. In the context of a computer network, terms "fabric" and "network" may be used interchangeably herein.

Nodes 902a-902h may be any combination of host systems, processor nodes, storage subsystems, and I/O chassis that represent user devices, service provider computers or third party computers.

User devices may include computer devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computer device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computer devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices 904. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computer devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computer device or server, user terminals and/or other devices on the network(s) 900. The network device(s) 924 of FIG. 9 may include similar components discussed with reference to the network interface module 812 of FIG. 8.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 808 may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit, comprising:
   completer devices including a first completer device;
   requester devices coupled to the completer devices through an interconnect fabric, wherein the requester devices include a first requester device configured to generate a first write transaction to be executed by the first completer device and a second write transaction to be executed by the first completer device; and
   a write re-order buffer (WROB) configured to:
     receive the first write transaction followed by the second write transaction;
     assign a first group identifier (ID) to the first write transaction;
     determine that the second write transaction depends on a result of the first write transaction;
     assign the first group ID to the second write transaction in response to determining that the second write transaction depends on the result of the first write transaction; and
     forward the first write transaction followed by the second write transaction to the interconnect fabric for routing, wherein the interconnect fabric is configured to route transactions such that transactions assigned to a same group ID are sequentially executed according to order of arrival at the interconnect fabric, but transactions that are assigned to different group IDs are permitted to be executed out of order.

2. The integrated circuit of claim 1, wherein the WROB is configured to:
   receive a first response from the first completer device, the first response confirming that the first write transaction has actually been completed; and
   prior to receiving the first response, send a second response to the first requester device, wherein the second response indicates completion of the first write transaction and causes the first requester device to send the second write transaction.

3. The integrated circuit of claim 1, wherein the WROB is further configured to:
   receive a third write transaction from the first requester device after receiving the second write transaction;
   determine that the third write transaction does not depend on the result of the first write transaction and also does not depend on a result of the second write transaction; and
   assign a second group ID to the third write transaction in response to determining that the third write transaction does not depend on the result of the first write transaction and also does not depend on the result of the second write transaction, wherein the first group ID and the second group ID are different.

4. An integrated circuit configured to:
   receive, from a requester device, a first write transaction followed by a second write transaction, wherein the first write transaction and the second write transaction are to be executed by one or more completer devices that are coupled to the requester device through an interconnect fabric;
   assign a first group identifier (ID) to the first write transaction;
   determine that the second write transaction depends on the first write transaction;

assign the first group ID to the second write transaction in response to determining that the second write transaction depends on the first write transaction; and forward the first write transaction followed by the second write transaction to the interconnect fabric for routing, wherein the interconnect fabric is configured to route transactions such that transactions assigned to a same group ID are executed in order.

5. The integrated circuit of claim 4, wherein the integrated circuit is configured to:

receive a first response confirming that the first write transaction has been completed; and prior to receiving the first response, send a second response to the requester device, wherein the second response indicates completion of the first write transaction.

6. The integrated circuit of claim 4, wherein the integrated circuit is configured to:

receive a third write transaction from the requester device after receiving the second write transaction;

determine that the third write transaction does not depend on the first write transaction and the second write transaction; and assign a second group ID to the third write transaction in response to determining that the third write transaction does not depend on the first write transaction and the second write transaction, wherein the first group ID and the second group ID are different.

7. The integrated circuit of claim 4, wherein the integrated circuit is configured to:

receive a first response confirming that the first write transaction has been completed;

receive, prior to the first response, a second response confirming that the second write transaction has been completed; and send, to the requester device, a third response indicating completion of the first write transaction followed by a fourth response indicating completion of the second write transaction.

8. The integrated circuit of claim 4, wherein the integrated circuit comprises:

a transaction log storing information about pending write transactions; and

ID assignment logic configured to perform the assigning of the first group ID to the first write transaction and the second write transaction, based on the information in the transaction log.

9. The integrated circuit of claim 8, wherein the transaction log is implemented using a combination of data structures maintained by the integrated circuit, the data structures comprising:

a transaction ID vector including a separate entry for each pending write transaction; and a group ID vector including a separate entry for each group ID.

10. The integrated circuit of claim 9, wherein the integrated circuit further comprises response update logic configured to:

send, to the requester device, a first response indicating completion of the first write transaction followed by a second response indicating completion of the second write transaction;

deallocate, from the transaction ID vector and in conjunction with sending the first response and the second response, entries associated with the first write transaction and the second write transaction; and deallocate, from the group ID vector, an entry associated with the first group ID based on determining that responses have been sent for every write transaction that was assigned the first group ID.

11. The integrated circuit of claim 4, wherein the integrated circuit is configured to select the first group ID from a pool of unassigned group IDs.

12. The integrated circuit of claim 11, wherein the integrated circuit is configured to:

determine that all transactions assigned to the first group ID have been completed; and responsive to determining that all transactions assigned to the first group ID have been completed, return the first group ID to the pool of unassigned group IDs.

13. The integrated circuit of claim 11, wherein the integrated circuit is configured to select a group ID from the pool of unassigned group IDs for assignment to a write transaction whenever the write transaction does not depend on another write transaction.

14. The integrated circuit of claim 4, wherein the integrated circuit is configured to determine that the second write transaction depends on the first write transaction based on the first write transaction and the second write transaction having a same destination address or destination addresses that are within a same address range.

15. The integrated circuit of claim 4, wherein the integrated circuit is configured to determine that the second write transaction depends on the first write transaction using non-address based attribute values that are specified by the requester device and included in the first write transaction and the second write transaction.

16. The integrated circuit of claim 15, wherein the non-address based attribute values include at least one of a virtual machine ID, a port ID, a source ID associated with the requester device, or a destination ID associated with a completer device.

17. The integrated circuit of claim 4, wherein the integrated circuit is configured to:

send a first response to the requester device indicating completion of the first write transaction or the second write transaction;

after sending the first response, receive a second response indicating that the first write transaction or the second write transaction did not complete successfully; and signal an error to the requester device based on receiving the second response.

18. A computer-implemented method, comprising:

receiving, by a write re-order buffer (WROB) and from a requester device, a first write transaction followed by a second write transaction, wherein the first write transaction and the second write transaction are to be executed by one or more completer devices that are coupled to the requester device through an interconnect fabric;

assigning, by one or more processing units of the WROB, a first group identifier (ID) to the first write transaction;

determining, by the one or more processing units, that the second write transaction depends on the first write transaction;

assigning, by the one or more processing units, the first group ID to the second write transaction in response to determining that the second write transaction depends on the first write transaction; and forwarding, by the WROB, the first write transaction and the second write transaction to the interconnect fabric for routing, wherein the interconnect fabric is configured to route transactions such that transactions assigned to a same group ID are executed in order.

19. The computer-implemented method of claim 18, further comprising:
   receiving, by the WROB, a first response confirming that the first write transaction has been completed; and
   prior to receiving the first response, sending a second response from the WROB to the requester device, wherein the second response indicates completion of the first write transaction.

20. The computer-implemented method of claim 18, further comprising:
   receiving, by the WROB, a third write transaction from the requester device after receiving the second write transaction;
   determining, by the one or more processing units, that the third write transaction does not depend on the first write transaction and the second write transaction; and
   assigning, by the one or more processing units, a second group ID to the third write transaction in response to determining that the third write transaction does not depend on the first write transaction and the second write transaction, wherein the first group ID and the second group ID are different.

* * * * *